United States Patent
Papakipos et al.

(10) Patent No.: US 9,594,405 B2
(45) Date of Patent: Mar. 14, 2017

(54) COMPOSITE TOUCH GESTURE CONTROL WITH TOUCH SCREEN INPUT DEVICE AND SECONDARY TOUCH INPUT DEVICE

(75) Inventors: Matthew Nicholas Papakipos, Palo Alto, CA (US); Matthew Cahill, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 13/276,950

(22) Filed: Oct. 19, 2011

(65) Prior Publication Data

US 2013/0100036 A1    Apr. 25, 2013

(51) Int. Cl.
*G06F 1/16*     (2006.01)
*G06F 3/0485*   (2013.01)
*G06F 3/0488*   (2013.01)
*G06F 3/0484*   (2013.01)

(52) U.S. Cl.
CPC ............ *G06F 1/1643* (2013.01); *G06F 1/169* (2013.01); *G06F 3/0485* (2013.01); *G06F 3/04842* (2013.01); *G06F 3/04883* (2013.01); *G06F 2203/04806* (2013.01); *G06F 2203/04808* (2013.01)

(58) Field of Classification Search
CPC ............. G06F 3/03547; G06F 3/04883; G06F 3/0488; G06F 2203/04808
USPC ................. 345/1.1, 1.3, 156, 169, 173, 174; 178/18.01, 18.06; 715/773, 863
See application file for complete search history.

(56) References Cited

U.S. PATENT DOCUMENTS

| | | | |
|---|---|---|---|
| 2006/0197750 A1* | 9/2006 | Kerr et al. | 345/173 |
| 2008/0165141 A1* | 7/2008 | Christie | G06F 3/044 345/173 |
| 2008/0320419 A1* | 12/2008 | Matas et al. | 715/863 |
| 2010/0020034 A1* | 1/2010 | Kim | G06F 1/1626 345/173 |
| 2010/0090964 A1* | 4/2010 | Soo | G06F 3/0416 345/173 |
| 2010/0188353 A1* | 7/2010 | Yoon et al. | 345/173 |
| 2010/0299592 A1* | 11/2010 | Zalewski et al. | 715/243 |
| 2011/0012921 A1* | 1/2011 | Cholewin | G06F 1/1626 345/619 |
| 2011/0021251 A1* | 1/2011 | Linden | G06F 1/1616 455/566 |
| 2011/0080359 A1* | 4/2011 | Jang | G06F 1/1643 345/173 |
| 2011/0090303 A1* | 4/2011 | Wu et al. | 348/14.16 |
| 2011/0109577 A1* | 5/2011 | Lee | G06F 3/044 345/173 |
| 2011/0122085 A1* | 5/2011 | Chang | G06F 1/1626 345/174 |

(Continued)

FOREIGN PATENT DOCUMENTS

| | | |
|---|---|---|
| EP | 2282256 A1 | 2/2011 |
| EP | 2341418 A1 | 7/2011 |

OTHER PUBLICATIONS

International Search Report and Written Opinion for International Application PCT/US2012/055962, Mar. 4, 2013.

*Primary Examiner* — Koosha Sharifi-Tafreshi

(57) ABSTRACT

In one embodiment, a mobile device comprising a front-side touch display and a back-side touch surface determines a touch gestured by a user of the mobile device based on touch inputs to the front-side touch display and touch inputs to the back-side touch surface.

6 Claims, 13 Drawing Sheets

(56) References Cited

U.S. PATENT DOCUMENTS

| | | | |
|---|---|---|---|
| 2011/0157053 A1* | 6/2011 | Webb et al. | 345/173 |
| 2011/0157055 A1* | 6/2011 | Tilley et al. | 345/173 |
| 2012/0299848 A1* | 11/2012 | Homma | G06F 3/0488 345/173 |
| 2013/0293505 A1* | 11/2013 | Krishnamurthy | G06F 3/0488 345/173 |
| 2014/0028557 A1* | 1/2014 | Otake | G02F 1/13338 345/158 |

* cited by examiner (distortion view)

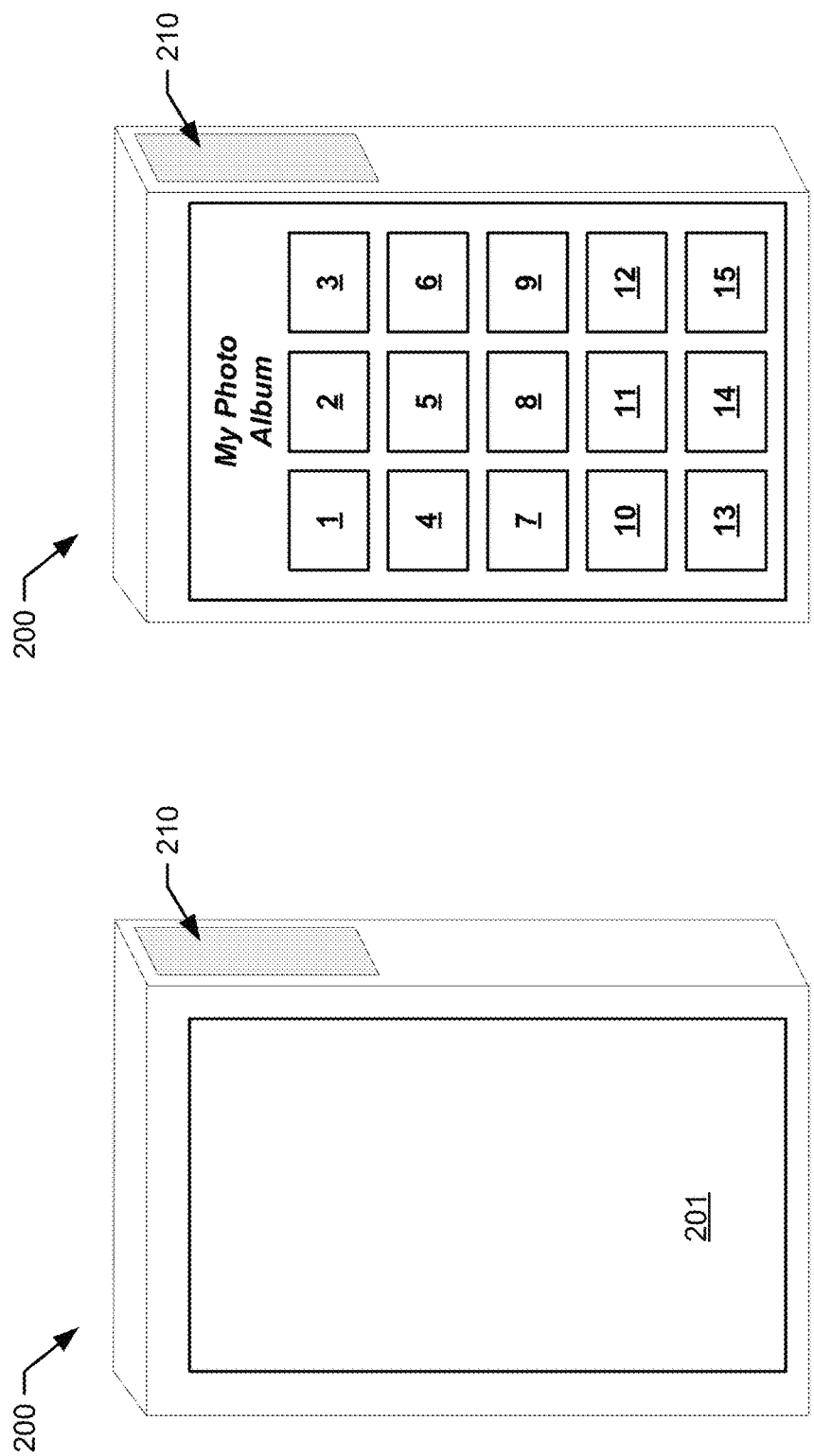

COMPOSITE TOUCH GESTURE CONTROL WITH TOUCH SCREEN INPUT DEVICE AND SECONDARY TOUCH INPUT DEVICE

TECHNICAL FIELD

The present disclosure generally relates to touch-based user interfaces, and, more particularly, to composite touch gestures detected from touch inputs to a mobile device's front-side touch display and touch inputs to the mobile device's secondary touch surface.

BACKGROUND

A touchpad is an input device including a surface that detects touch-based inputs. A touch screen is an electronic visual display that detects the presence and location of user touch inputs. Mobile devices (such as a mobile phone, a tablet computer, and a laptop computer) often incorporate a touch screen or a touchpad to facilitate user interactions with application programs running on the mobile device.

SUMMARY

Particular embodiments relate to composite touch gestures based on touch inputs to a mobile device's front-side touch display and touch inputs to the mobile device's secondary touch surface. These and other features, aspects, and advantages of the disclosure are described in more detail below in the detailed description and in conjunction with the following figures.

BRIEF DESCRIPTION OF THE DRAWINGS

FIGS. 5A-5D illustrate a mobile device with a front-side touch display and a side-mounted touch surface.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A touchpad is an input device including a surface that detects touch-based inputs of users. Similarly, a touch screen is an electronic visual display surface that detects the presence and location of user touch inputs. So-called dual touch or multi-touch displays or touchpads refer to devices that can identify the presence, location and movement of more than one touch input, such as two- or three-finger touches. A system incorporating one or more touch-based input devices may monitor one or more touch-sensitive surfaces for touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events or gestures (e.g., tap, drag, swipe, pinch).

Figure 1:
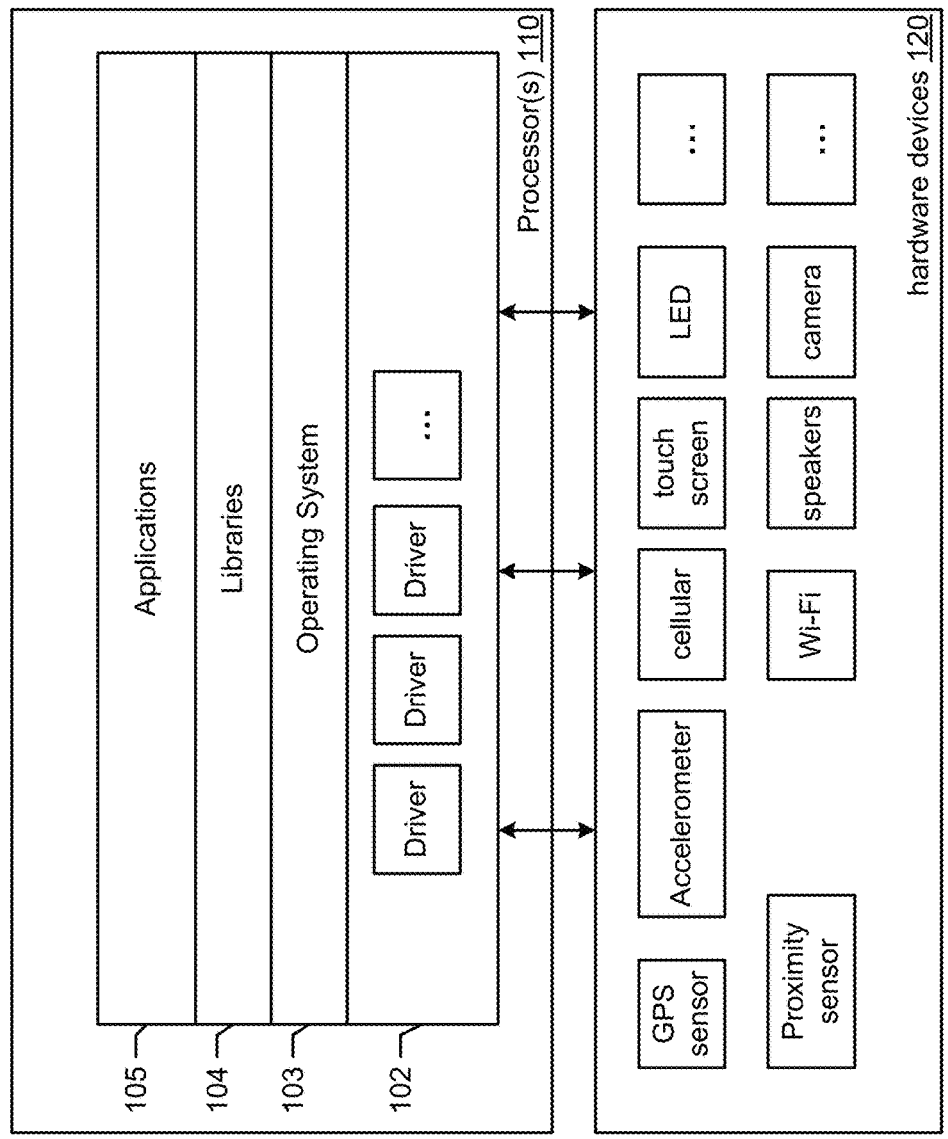
FIG. 1 illustrates an example processing stack of a mobile device.

Recognition of touch events by a system with one or more touch-based input devices—i.e., identifying one or more touch inputs by a user and determining corresponding touch event(s)—may be implemented by a combination of hardware, software, and/or firmware (or device drivers). FIG. 1 illustrates an example processing stack of a mobile device (e.g., a smart phone). In the example of FIG. 1, the mobile device may comprise hardware devices (120) such as Input-Output (I/O) devices (e.g., a touch screen, speakers, a light-emitting diode or LED indicator, a camera, etc.), communication interface devices (e.g., a cellular interface, a Wi-Fi interface), sensors (e.g., a Global Positioning System or GPS sensor, a proximity sensor, an accelerometer, etc.), and other hardware devices. One or more device drivers in driver layer 102 hosted by one or more processors 110 of the mobile device can communicate and control the hardware devices. One or more processors 110 can execute various software programs, for example, operating system 103 running one or more application programs (e.g., web browser, address book, etc.) in applications 105 and managing one or more hardware devices via the one or more device drivers in driver layer 102. Libraries 104 can include one or more libraries used by one or more application programs in applications 105. For example, the mobile device may comprise one or more device drivers communicating with one or more touch-based input devices and detecting touch inputs. The system may comprise a touch gesture library containing computer program code for interpreting touch inputs detected by the device drivers to touch events or gestures. A program running on the mobile device can detect and process touch events by subscribing as listeners to touch event modules in the touch gesture library.

Particular embodiments herein relate to a mobile device (e.g., a mobile phone, a smart phone, a tablet, or other portable device) with a touch display disposed on a front side of the device and a secondary touch surface disposed on a back side or a lateral side of the device. The back-mounted or side-mounted touch surface can improve user experience associated with the mobile device as the back-side touch surface can provide an additional area for user inputs. More particularly, a user can interact with an application hosted by the mobile device using one or more composite touch gestures based on touch inputs to both the front-side touch display and the secondary touch surface.

Figure 2:
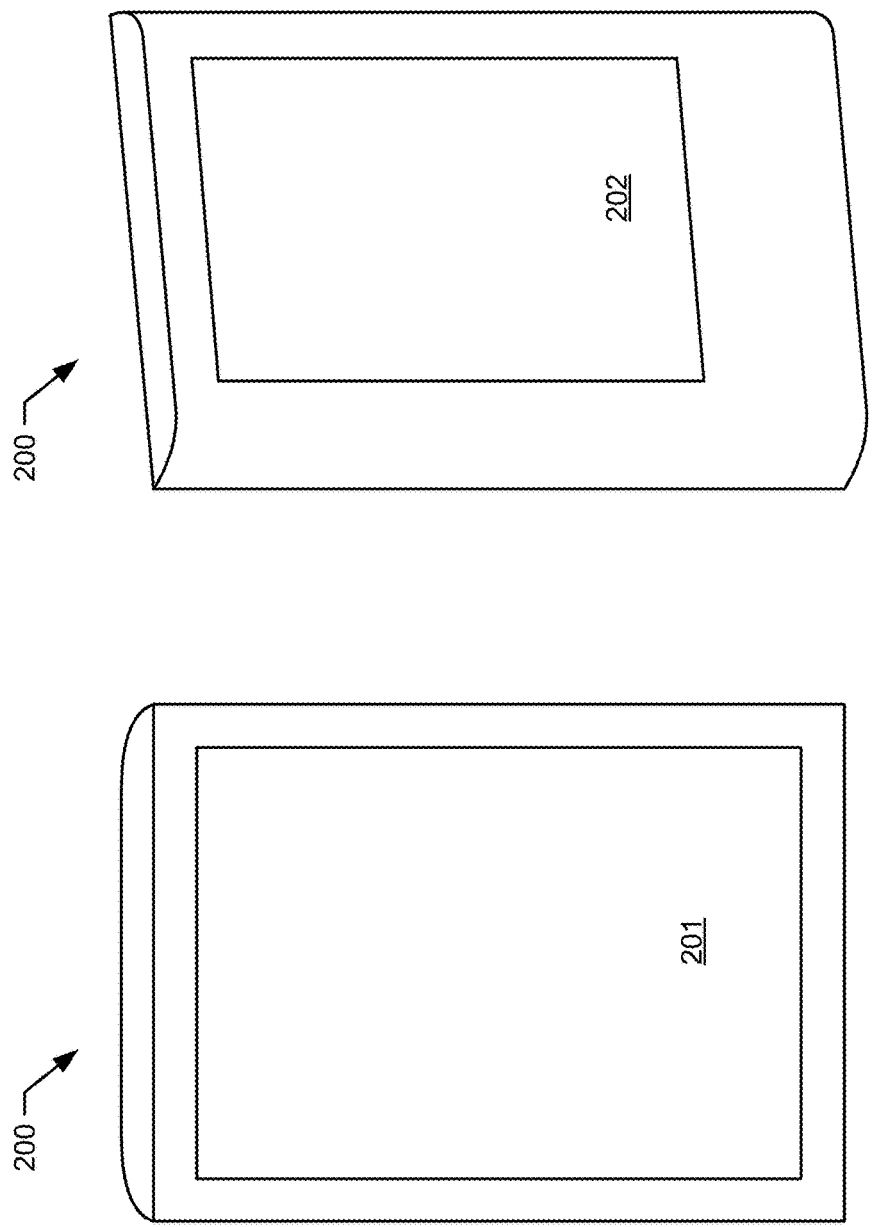
FIGS. 2 illustrates an example mobile device.

FIG. 2 illustrates an example mobile device. In the example of FIG. 2, mobile device 200 may comprise a housing with a touch display 201 disposed on a front side of the housing and a secondary touch surface 202 disposed on a back side of the housing. Touch surface 202 may be a single-touch, dual-touch, or multi-touch device. Touch display 201 may be a single-touch, dual-touch, or multi-touch display. In some embodiments, touch surface 202 may comprise a touch screen. Mobile device 200 may comprise a touch gesture library containing touch event modules or logic that can recognize touch inputs, and determine one or more corresponding touch events or gestures (e.g., tap, drag, swipe, pinch). On or more applications hosted by mobile device 200 may be configured to respond to one or more touch events or gestures by subscribing as listeners to touch event modules in the touch gesture library.

In particular embodiments, an application hosted by mobile device 200 may present the application's user interface in front-side touch display 201. In particular embodiments, in response to one or more touch inputs generated by back-side touch surface 202 during presentation of the application user interface, a composite touch gesture process may access data identifying one or more locations of the one or more touch inputs generated by back-side touch surface 202, access data identifying one or more regions of the application user interface corresponding to the one or more locations of the one or more touch inputs generated by back-side touch surface 202, and determine a touch gesture based on one or more touch inputs generated by front-side touch display 201 and the one or more touch inputs generated by back-side touch surface 202.

Figure 3B:
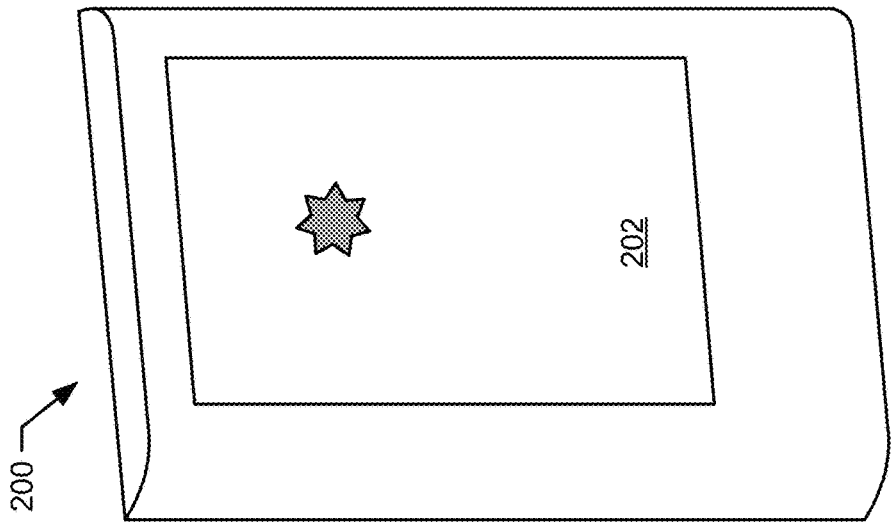
FIGS. 3A-3H illustrate composite touch gestures based on touch inputs generated by a front-side touch display and by a back-side touch surface.
Figure 3A:
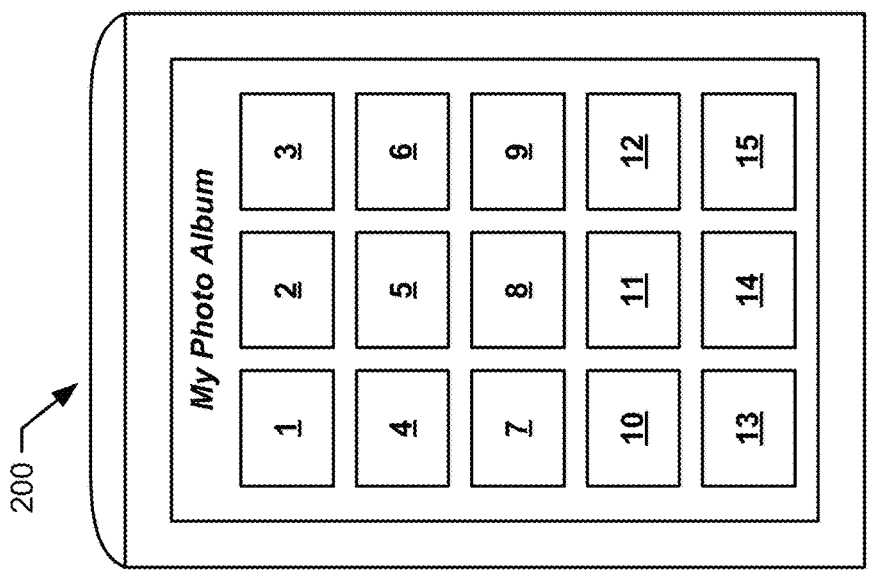
Figure 3D:
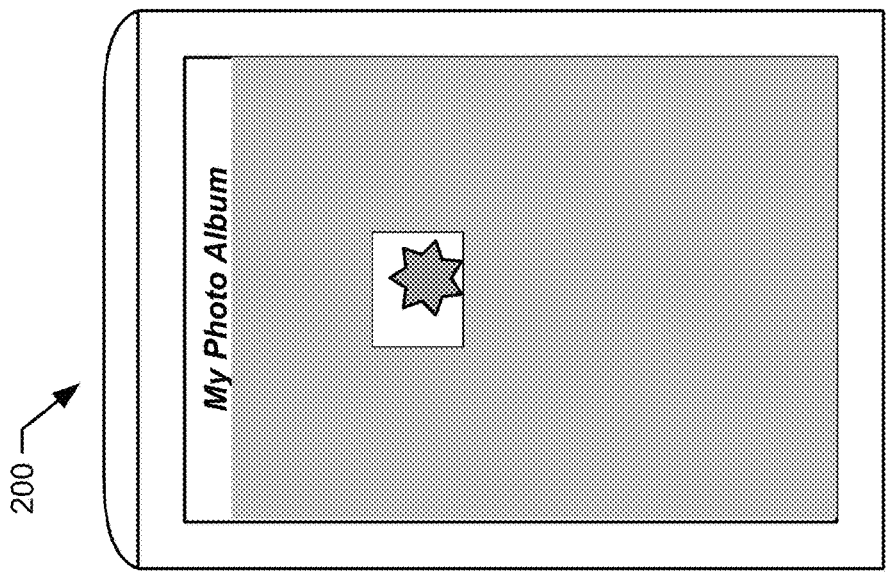
Figure 3C:
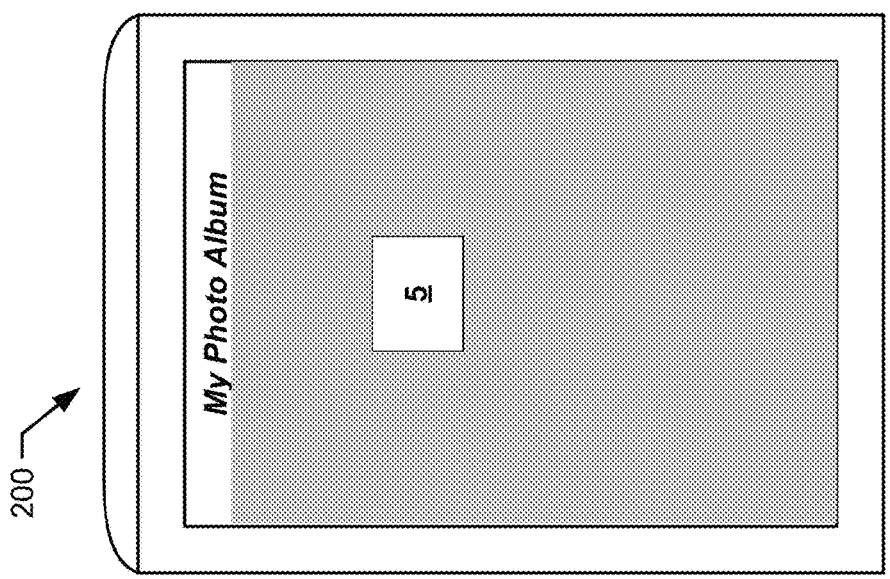

FIGS. 3A-3H illustrate composite touch gestures based on touch inputs generated by a front-side touch display and by a back-side touch surface. In the example of FIG. 3A, a photo album application hosted by mobile device 200 displays photo thumbnails of a photo album ("My Photo Album") in a user interface displayed in front-side touch display 201. A user may tap on back-side touch surface 202, as illustrated in 3B. In particular embodiments, the composite touch gesture process may access data identifying a location of touch surface 202 corresponding to the tap touch input (e.g., via a device driver of touch surface 202). In particular embodiments, the composite touch gesture process may access data identifying a region of the application user interface corresponding to the location of touch surface 202 for the tap touch input. In some embodiments, the composite touch gesture process may cause the photo album application to adjust presentation of one or more content displayed near the region of the application user interface corresponding to the location of touch surface 202 for the tap touch input. For example, the user may tap on back-side touch surface 202 at a location behind photo thumbnail "5" (as illustrated in FIG. 3B). The composite touch gesture process may access data identifying the location of the tap touch input on touch surface 202, access data identifying the region of the application user interface corresponding to the tap touch location (i.e., photo thumbnail "5"), and cause the photo album application to highlight photo thumbnail "5", as illustrated in FIG. 3C. Additionally, the composite touch gesture process may provide visual feedback (i.e., a warping effect, a shading effect, an icon, or a pointer) to a user on front-side touch display 201 about where the user's touch or near-touch input is on back-side touch surface 202 relative to front-side touch display 201. For example, the use's index finger may hover near back-side touch surface 202 at a location behind photo thumbnail "5". The composite touch gesture process may access data identifying the location of the near-touch input on touch surface 202, accessing data identifying the region of the application user interface corresponding to the near-touch input location (i.e., photo thumbnail "5"), and cause the photo album application to create a warping effect at and around photo thumbnail "5."

Figure 3F:
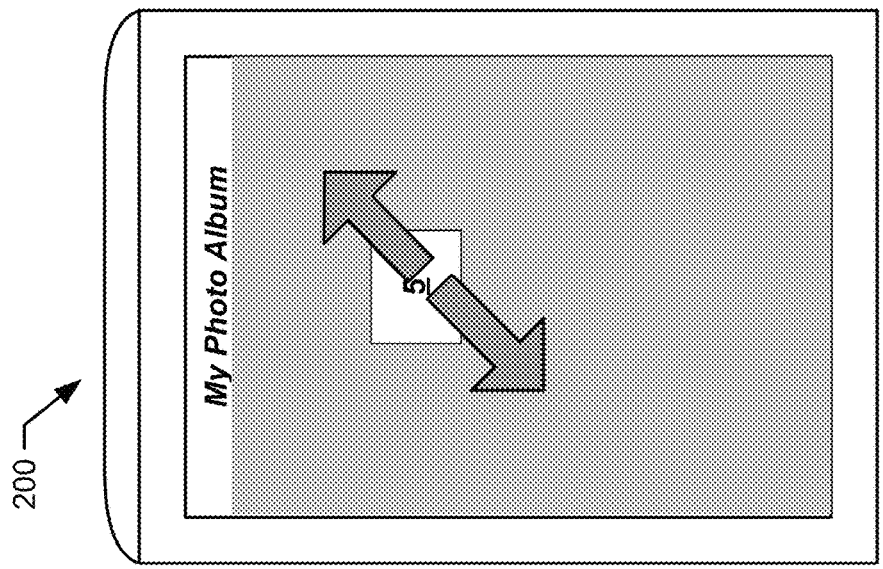
Figure 3E:
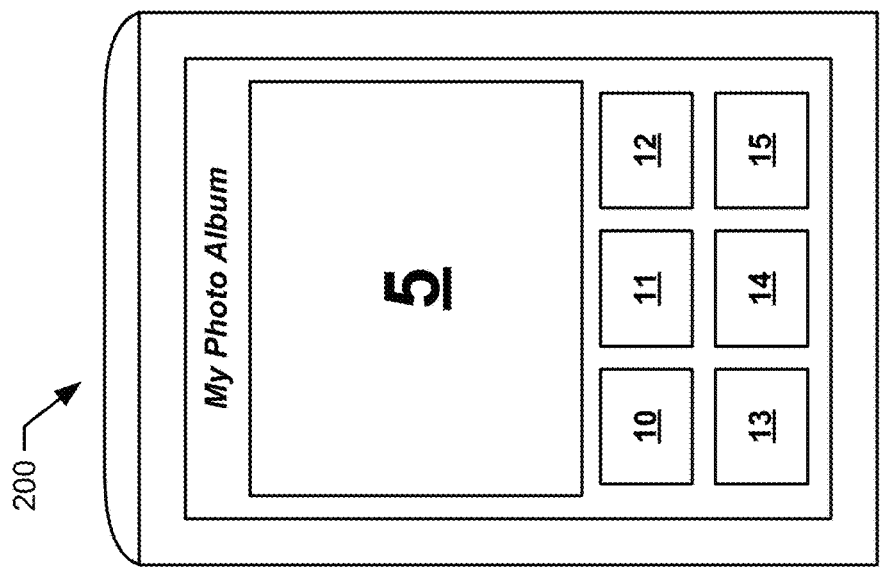

For example, the user may use a finger to draw a circle on back-side touch surface 202. The composite touch gesture process may access location data identifying the circle from the user's touch input to back-side touch surface 202, accessing data identifying a circular area of the application user interface corresponding to the circle, and cause the photo album application to highlight photo thumbnails within the circular area. In particular embodiments, the composite touch gesture process may determine a touch gesture based on one or more touch inputs generated by front-side touch display 201 and the tap touch input on back-side touch surface 202. For example, the user may tap on the region of photo thumbnail "5" in touch display 201, as illustrated in FIG. 3D. The composite touch gesture process may determine a tap-and-tap touch gesture based on the tap touch input on front-side touch display 201 and the tap touch input on back-side touch surface 202. In response to the tap-and-tap touch gesture, the photo album application may display a photo corresponding to photo thumbnail "5" in larger size in touch display 201, as illustrated in FIG. 3E. Alternatively, the user may use two fingers to pinch out from the region of photo thumbnail "5" in touch display 201, as illustrated in FIG. 3F. The composite touch gesture process may determine a tap-and-pinch-out touch gesture based on the pinch-out touch input on front-side touch display 201 and the tap touch input on back-side touch surface 202. In response to the tap-and-pinch-out touch gesture, the photo album application may display a photo corresponding to photo thumbnail "5" in larger size in touch display 201, as illustrated in FIG. 3E.

Figures 3G, 3H:
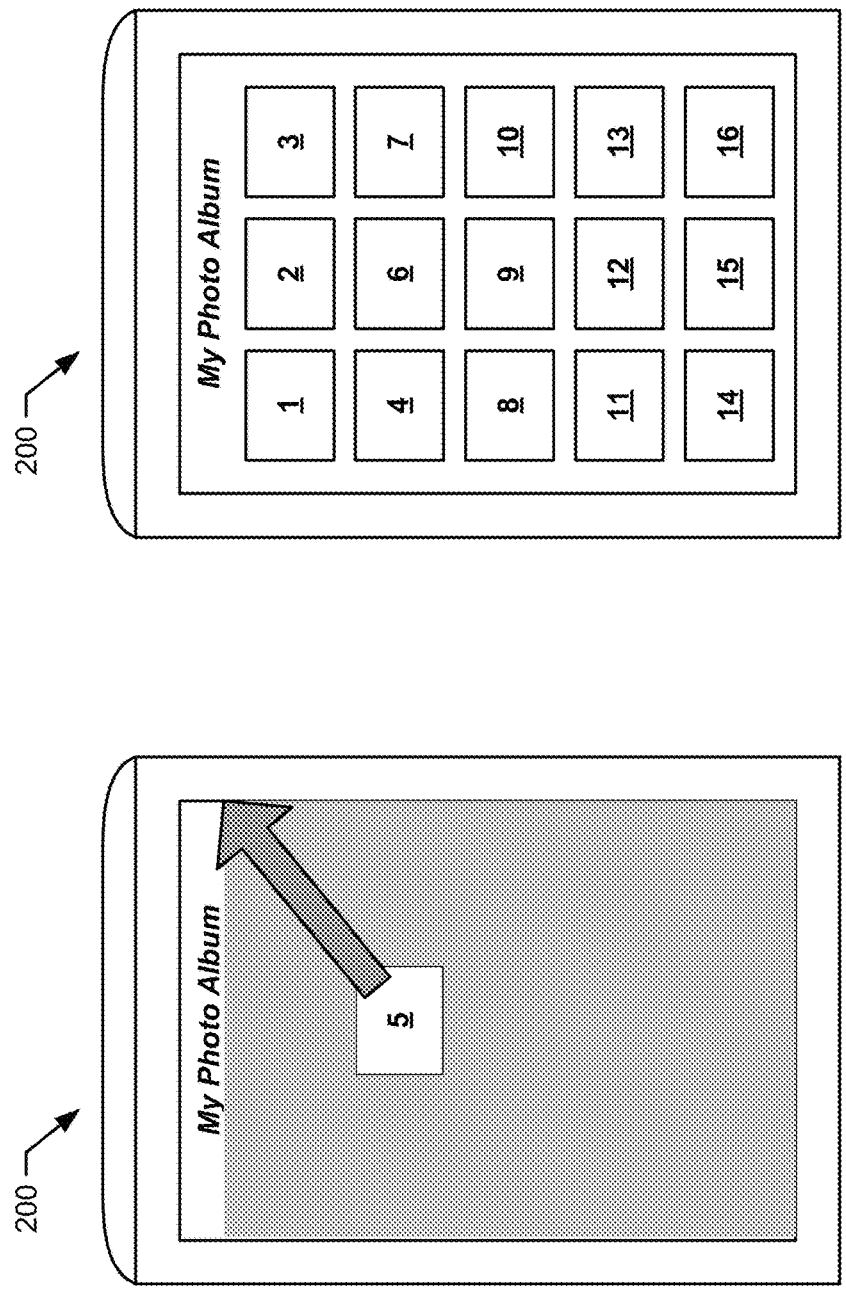

As yet for another example, the user may use one finger to swipe on touch display 201 from the region of photo thumbnail "5" to an edge of touch display 201, as illustrated in FIG. 3G. The composite touch gesture process may determine a tap-and-swipe-out touch gesture based on the swipe-out touch input on front side touch display 201 and the tap touch input on back-side touch surface 202. In response to the tap-and-swipe-out touch gesture, the photo album application may delete a photo corresponding to photo thumbnail "5" from the photo album "My Photo Album" and remove photo thumbnail "5" from the application user interface, as illustrated in FIG. 3H.

Figure 3I:
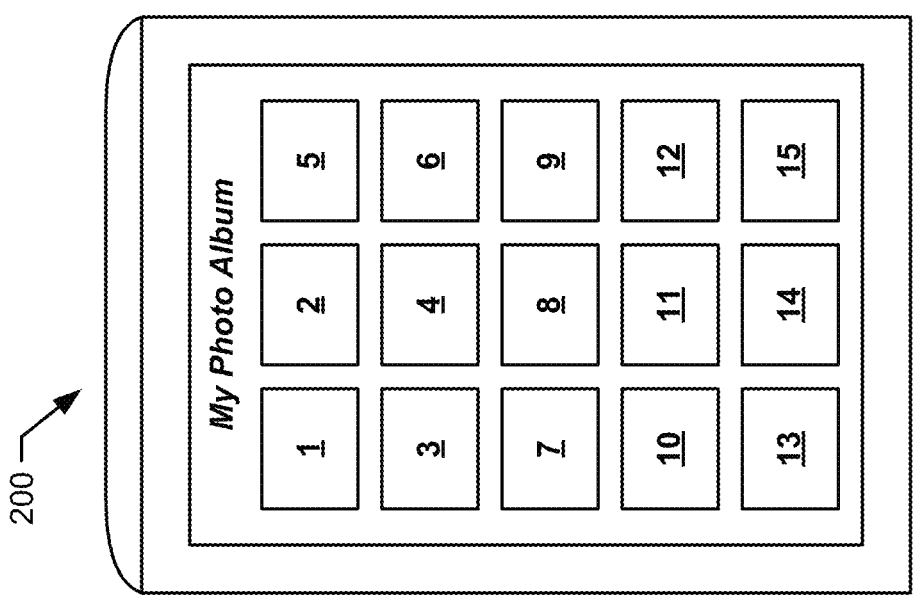
FIG. 3I illustrates an application user interface's response to a touch input generated by a front-side touch display.

An application user interface may have different responses to similar touch gestures performed by a user on front-side touch display 201, or on back-side touch surface 202, or composite touch gestures on both front-side touch display 201 and back-side touch surface 202. For example, in the photo album application user interface described above, a user may use a tap-and-swipe composite touch gesture (FIGS. 3B and 3G) to delete photo thumbnail "5." In contrast, for example, a user may use a swipe touch input on front-side touch display 201 to move and re-arrange the photo thumbnails in the graphical user interface, —e.g., photo thumbnail "5" can be moved by a swipe touch input on front-side touch display 201 (as illustrated by the arrow in FIG. 3G) from a middle to a upper-right corner of the application user interface (as illustrated in FIG. 3I). For example, a user may use a double-tap touch input on photo thumbnail "5" on front-side touch display 201 to display photo thumbnail "5" in larger size (as illustrated in FIG. 3E). A user may use a double-tap touch input on back-side touch surface 202 at a location behind photo thumbnail "5" to delete the photo thumbnail "5." For example, a user may use a tap touch input on back-side touch surface 202 at a location behind photo thumbnail "5", causing the application user interface to highlight the photo thumbnail "5". Additionally, the user may double-tap on the highlighted photo thumbnail "5" on front-side touch display 201, causing the application user interface to present an overlaying frame for composing an email with an attachment of a photo corresponding to the photo thumbnail "5."

Figure 4B:
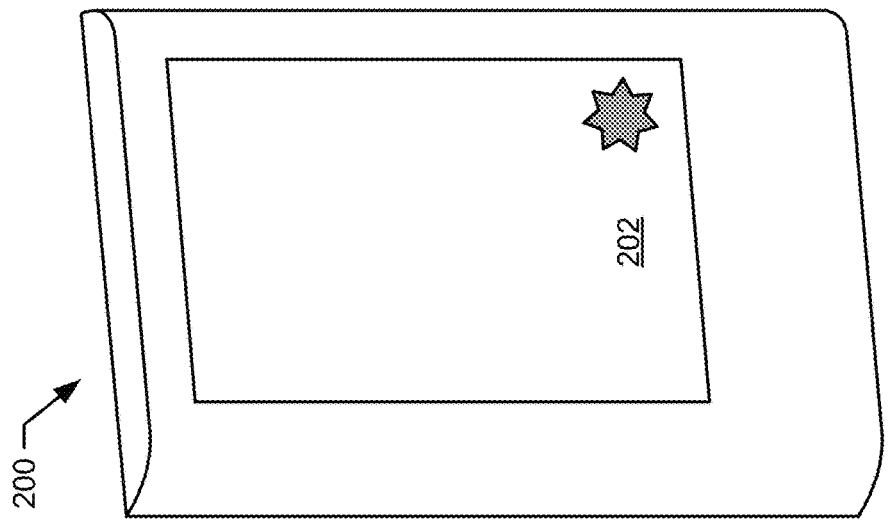
FIGS. 4A-4F illustrate additional composite touch gestures based on touch inputs generated by a front-side touch display and by a back-side touch surface.
Figure 4A:
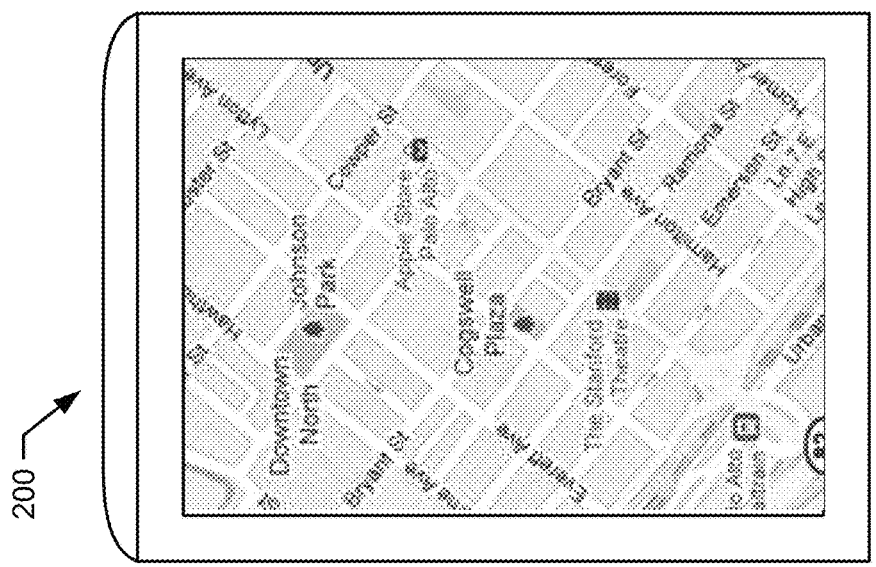
Figure 4D:
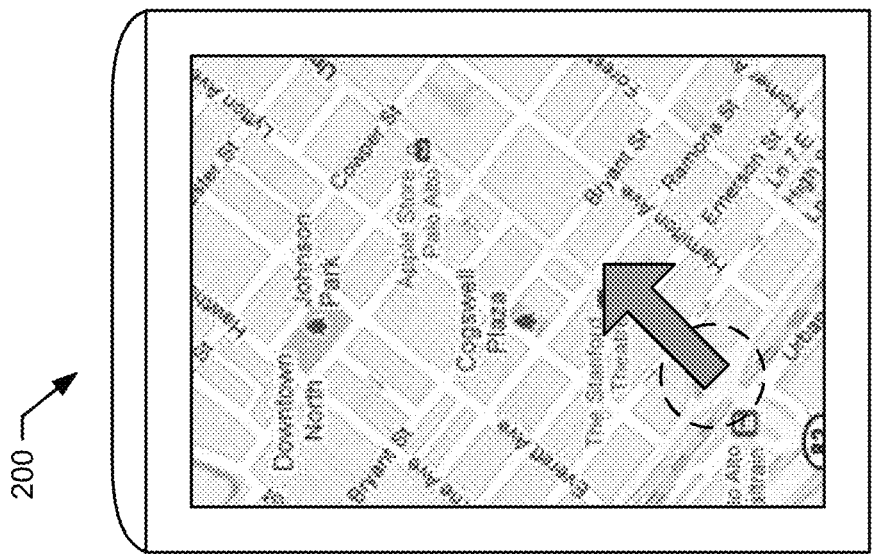
Figure 4C:
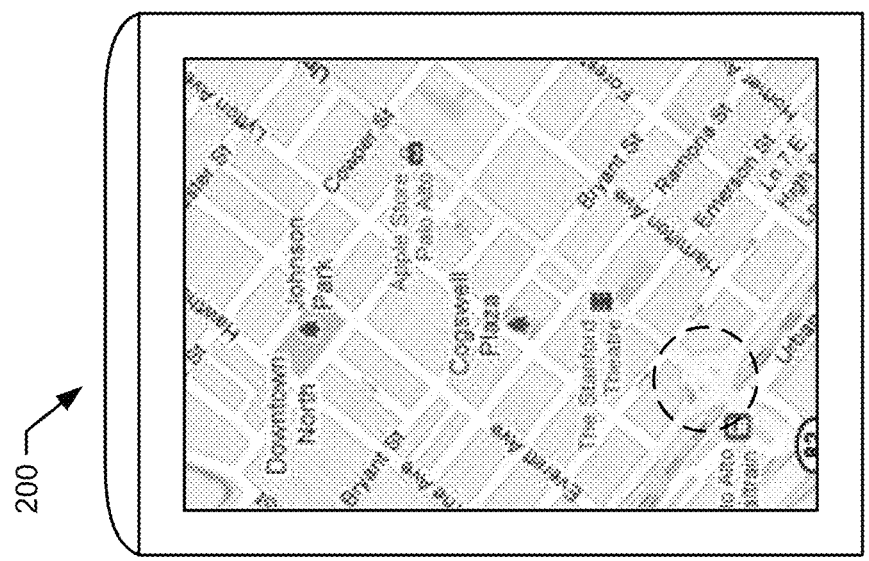
Figure 4F:
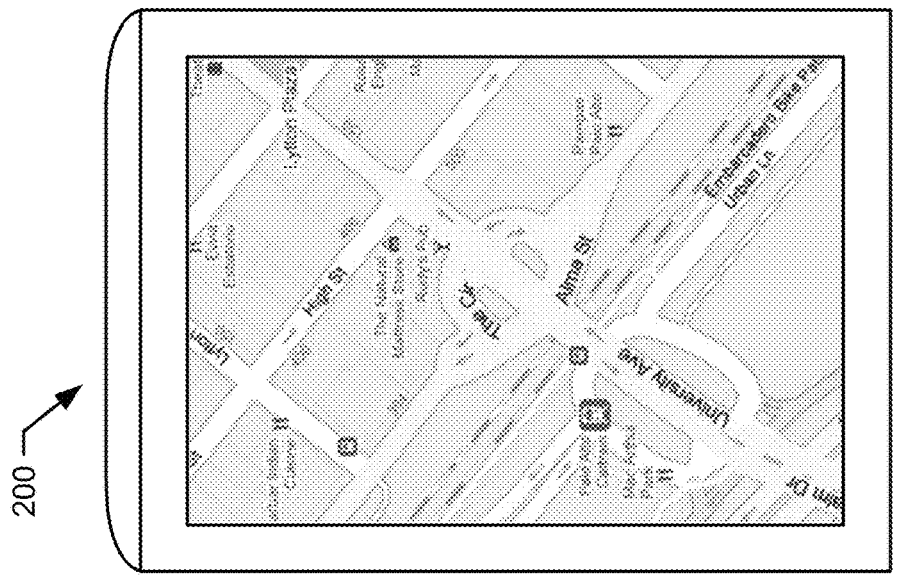
Figure 4E:
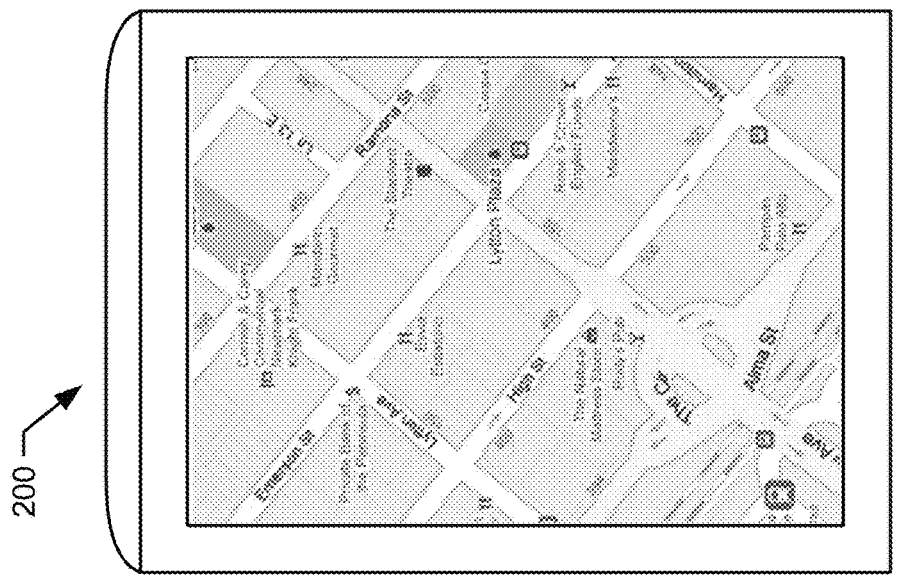

FIGS. 4A-4E illustrate additional composite touch gestures based on touch inputs generated by a front-side touch display and by a back-side touch surface. In the example of FIG. 4A, a map application hosted by mobile device 200 displays a map in a user interface displayed in front-side touch display 201. A user may tap on back-side touch surface 202, as illustrated in FIG. 4B. In particular embodiments, the composite touch gesture process may access data identifying a location of touch surface 202 corresponding to the tap touch input. In particular embodiments, the composite touch gesture process may access data identifying a region of the application user interface corresponding to the location of touch surface 202 for the tap touch input. In some embodiments, the composite touch gesture process may cause the map application to adjust presentation of one or more content displayed near the region of the application user interface corresponding to the location of touch surface 202 for the tap touch input. For example, the user may tap on back-side touch surface 202 near the lower-left corner of touch surface 202 (as illustrated in FIG. 4B). The composite touch gesture process may access data identifying the location of the tap touch input on touch surface 202, access data identifying the region of the application user interface corresponding to the tap touch location (e.g., near lower-left corner), and cause the map application to present a topographical view at the region, as if an elastic film is protruded by a finger from behind, as illustrated in FIG. 4C. In particular embodiments, the composite touch gesture process may determine a touch gesture based on one or more touch inputs generated by front-side touch display 201 and the tap touch input on back-side touch surface 202. For example, the user may map use one finger to swipe from the region of the application user interface that corresponds to the tap touch input on back-side touch surface 202, as illustrated in FIG. 4D. The composite touch gesture process may determine a tap-and-swipe touch gesture based on the swipe touch input on front-side touch display 201 and the tap touch input on back-side touch surface 202. In response to the tap-and-swipe touch gesture, the map application may adjust the application user interface to zoom in and display a portion of map corresponding to the swipe touch input, as illustrated in FIG. 4E. Alternatively, in response to the tap-and-swipe touch gesture, the map application may adjust the application user interface to transition the region corresponding to the tap touch input on back-side touch surface 202 to a center of the application user interface, and zoom in and display a portion of map corresponding to the swipe touch input, as illustrated in FIG. 4F.

Figure 5D:
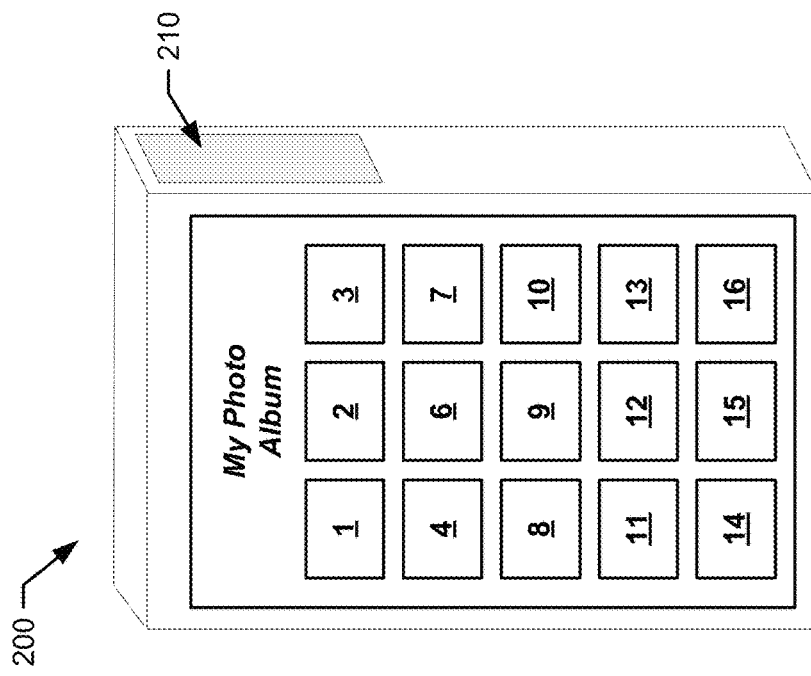
Figure 5C:
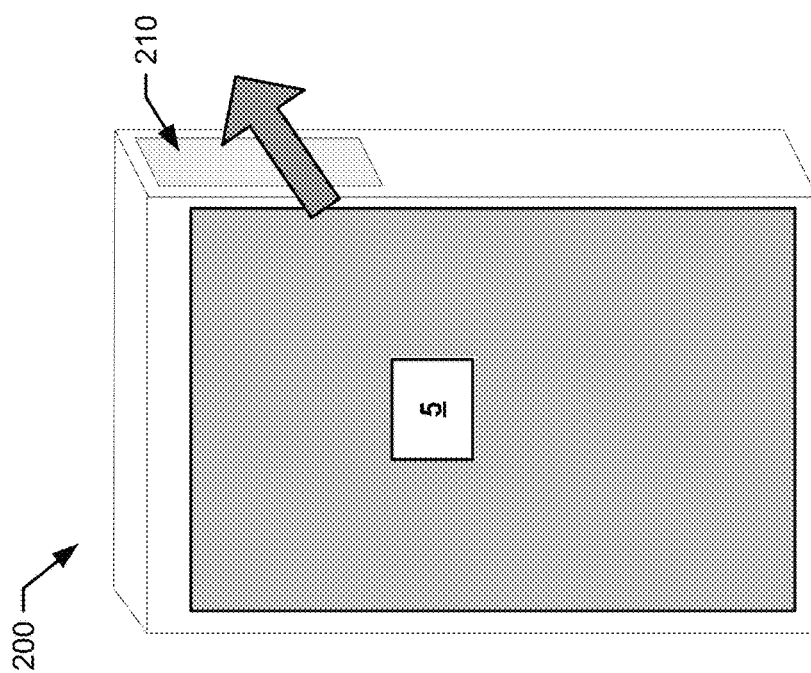

FIGS. 5A-5D illustrate mobile device 200 with a secondary touch surface 210 disposed on a lateral side of the housing. In particular embodiments, the composite touch gesture process may access data indicating one or more touch inputs generated at touch display 201 and data indicating one or more touch inputs generated at side-mounted touch surface 210, and determine a touch gesture based on the one or more touch inputs generated at touch display 201 and the one or more touch inputs generated at side-mounted touch surface 210. For example, a user may tap on touch display 201 at a location of photo thumbnail "5" of an application user interface of a photo album application illustrated in FIG. 5B. The composite touch gesture process may access data identifying the location of the tap touch input on touch display 201, access data identifying the region of the application user interface corresponding to the tap touch location (i.e., photo thumbnail "5"), and cause the photo album application to highlight photo thumbnail "5", as illustrated in FIG. 5C. The user may swipe or flick his finger in a backward lateral direction (as illustrated by the arrow in FIG. 5C) on side-mounted touch surface 210. The composite touch gesture process may determine a tap-and-backward-lateral-flick gesture based on the tap touch input on touch display 201 and the backward-lateral-flick touch input on side-mounted touch surface 210. In response to the tap-and-backward-lateral-flick touch gesture, the photo album application may delete a photo corresponding to photo thumbnail "5" from the photo album "My Photo Album" and remove photo thumbnail "5" from the application user interface, as illustrated in FIG. 5D.

Figure 6:
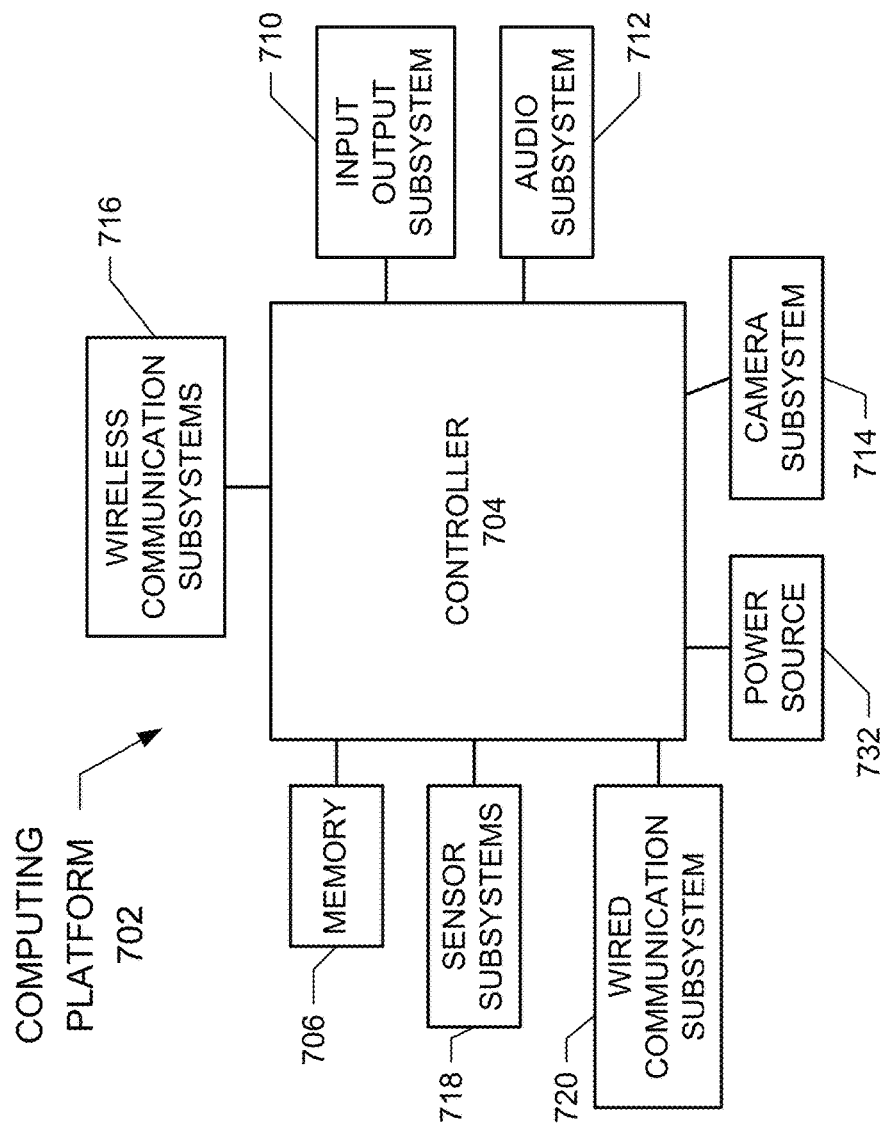
FIG. 6 illustrates an example mobile device platform.

The touch input processing functionality described above can be implemented as a series of instructions stored on a computer-readable storage medium that, when executed, cause a programmable processor to implement the operations described above. While the mobile device may be implemented in a variety of different hardware and computing systems, FIG. 6 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, Unix Linux-based, Android-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network).

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device. In particular embodiments, various components of computing platform 702 may be operably connected together by one or more buses (including hardware and/or software). Additionally, computing platform 702 may be powered by power source 732.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A device, comprising:
  a device housing;
  a touch-sensitive display disposed on a front side of the device housing;
  a touch-sensitive surface disposed on a lateral side of the device housing, wherein the touch-sensitive surface is separate and distinct from the touch-sensitive display and from a back side of the device housing;
  one or more computer-readable non-transitory storage media embodying logic that is operable, when executed, to:
    detect a first touch input on the touch-sensitive display, wherein the first touch input comprises a tap gesture executed on the touch-sensitive display in a region of an application user interface;
    identify an interactive element displayed on the touch-sensitive display that corresponds to a location of the first touch input, wherein the interactive element is a photo thumbnail from a series of photo thumbnails;
    detect a second touch input comprising a backward lateral flick gesture on the touch sensitive surface;

determine a composite gesture made up of a combination of the first touch input and the second touch input;

delete a photo corresponding to the photo thumbnail that is present at the location of the first touch input from the device in response to the composite gesture.

2. A method comprising:

by a computing device, detecting a first touch input comprising a tap gesture on a touch-sensitive display, wherein the touch-sensitive display is disposed on a front side of a device housing of the computing device;

identifying an interactive element displayed on the touch-sensitive display that corresponds to a location of the first touch input, wherein the interactive element is a photo thumbnail from a series of photo thumbnails;

by the computing device, detecting a second touch input, wherein the second touch input comprises a backward lateral flick gesture executed on a touch-sensitive surface disposed on a lateral side of the device housing;

by the computing device, determining a composite gesture made up of a combination of the first touch input and the second touch input;

and;

by the computing device, deleting a photo corresponding to the photo thumbnail that is present at the location of the first touch input from the device in response to the composite gesture.

3. One or more non-transitory computer-readable storage media embodying software operable when executed by a computing device to:

detect a first touch input on a touch-sensitive display, wherein the touch-sensitive display is disposed on a front side of a device housing of the computing device, the first touch input comprising a tap gesture at a location corresponding to an interactive element displayed on the touch-sensitive display; identify the interactive element displayed on the touch-sensitive display that corresponds to the location of the first touch input, wherein the interactive element is a photo thumbnail from a series of photo thumbnails;

detect a second touch input, wherein the second touch input comprises a backward lateral flick gesture executed on a touch-sensitive surface disposed on a lateral the side of the device housing;

determine a composite gesture made up of a combination of the first touch input and the second touch input; and delete a photo corresponding to the photo thumbnail that is present at the location of the first touch input from the device in response to the composite gesture.

4. The device of claim 1, further comprising logic that is operable, when executed, to:

provide visual feedback on the touch-sensitive display at the region of the application user interface in response to the first touch input, wherein the visual feedback is a highlight effect on the touch-sensitive display corresponding to a location of the first touch input.

5. The method of claim 2, comprising:

accessing data identifying a region of an application user interface corresponding to the first touch input location; and providing visual feedback on the touch-sensitive display at the region of the application user interface in response to the first touch input, wherein the visual feedback is a highlight effect on the touch-sensitive display corresponding to a location of the first touch input.

6. The one or more non-transitory computer-readable storage media of claim 3, further embodying software operable when executed by the computing device to:

access data identifying a region of an application user interface corresponding to the first touch input location; and provide visual feedback on the touch-sensitive display at the region of the application user interface in response to the first touch input, wherein the visual feedback is a highlight effect on the touch-sensitive display corresponding to a location of the first touch input.

* * * * *